No. 874,131. PATENTED DEC. 17, 1907.
G. P. STANLEY & W. W. TAINTER.
PROCESS OF MAKING TOOTHPICKS.
APPLICATION FILED MAR. 22, 1906.
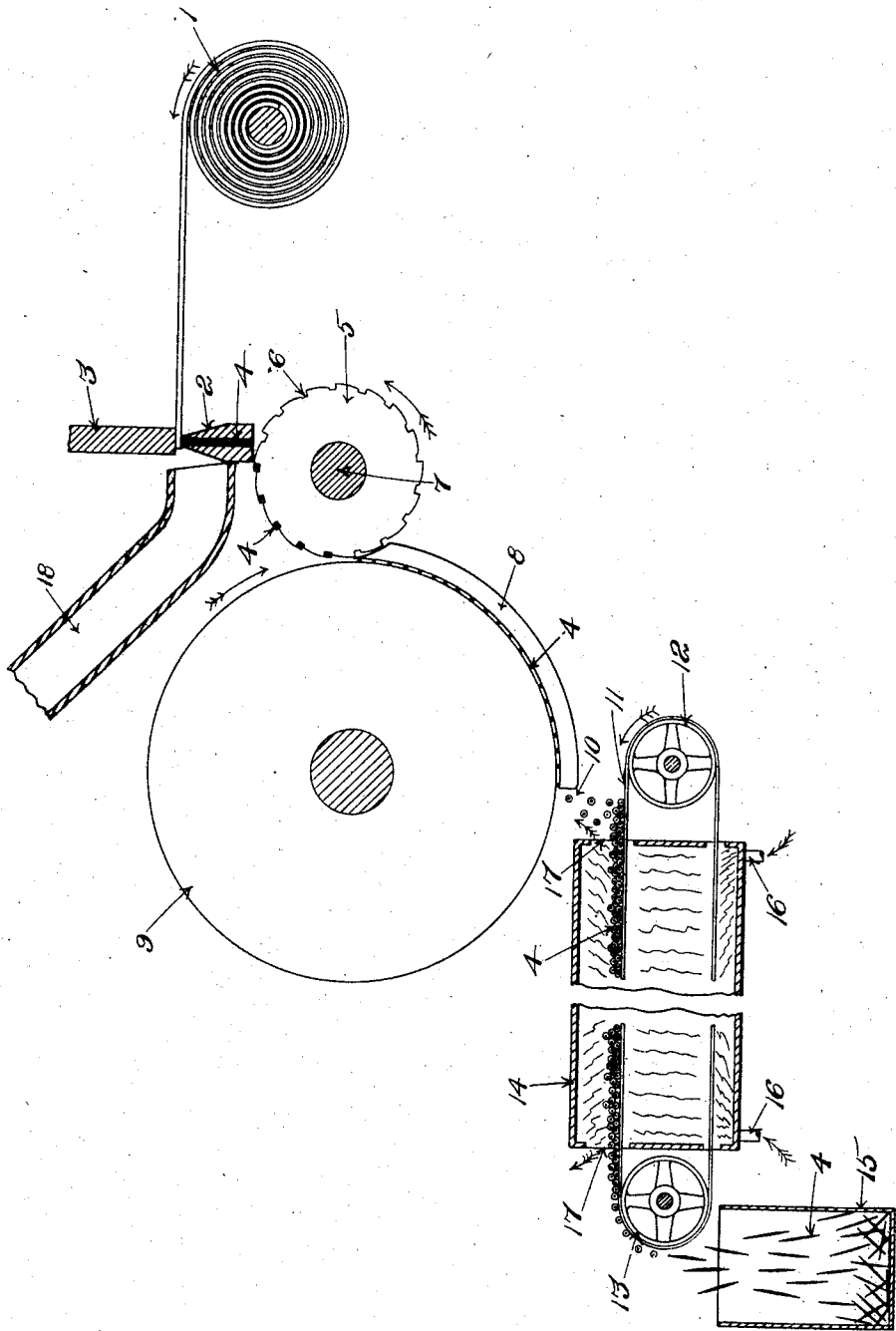

UNITED STATES PATENT OFFICE.

GEORGE P. STANLEY AND WILLIS W. TAINTER, OF DIXFIELD, MAINE.

PROCESS OF MAKING TOOTHPICKS.

No. 874,131.      Specification of Letters Patent.      Patented Dec. 17, 1907.

Application filed March 22, 1906. Serial No. 307,427.

*To all whom it may concern:*

Be it known that we, GEORGE P. STANLEY and WILLIS W. TAINTER, citizens of the United States, residing at Dixfield, county of Oxford, State of Maine, have invented a certain new and useful Improvement in Processes of Making Toothpicks, of which the following is a specification, reference being had therein to the accompanying drawings.

Our invention has for its object an improvement in the method of manufacturing wooden tooth picks.

Our improvement is fully set forth in the following description and the novel features thereof are pointed out and clearly defined in the claims at the close of this specification.

In the manufacture of wooden tooth picks as sometimes practiced, a "veneer" is first formed which is a continuous strip of a width equal or substantially equal to the length of the tooth pick to be formed, and of a thickness sufficiently greater than the diameter of the tooth pick at the point of greatest diameter to allow for the finishing operations. In the manufacture of double pointed tooth picks this veneer is beveled at each edge so that a blank or portion from which a single tooth pick may be formed which is cut therefrom is of a shape more closely approximating the shape of the finished tooth pick than it would be if the strip of veneer was not beveled at its edges. The strip of veneer in a coil as it is formed from the log, and in a green or undried state is placed in a blank forming machine and as it is fed into the machine the tooth pick blanks are died out or cut from it, by means of a die, to the proper form and dimensions. These blanks are then placed in drying trays which are placed in a drier of suitable construction where the blanks are subjected to the proper drying conditions. After they are dried they are taken from these drying trays and placed in the feed device of a finishing machine by the operation of which the blanks are brought to the proper shape of a finished tooth pick. In the condition in which they leave the finishing machine they are more or less rough with the fibers of the wood raised and to smooth them or give them the final finishing operation they are "hustled," that is put into a tumbling barrel either with or without the addition of some other substance as chalk, and subjected to the tumbling operation for a greater or less length of time, the time varying in accordance with the smoothness and perfection of finish which it is desired to give them. They are frequently tumbled for three days or more. They are taken from the tumbling apparatus smooth and perfect in finish and appearance and are then packed in boxes of varying sizes for the market.

It will be noted that in the above operation the blanks are handled after they are dried out in order to put them into trays which are placed in the drier, after they are dried they are again handled in taking them from the trays and putting them into the feed of the finishing machine; after they have gone through the finishing machine they are again handled to be placed in the tumbling machine. These handlings of the blanks and picks are the cause of a very considerable loss due to misplacement and breakage. It will also be noted in the above described operation that after the blanks are formed they are dried before being put through the finishing machine, that being the common method heretofore used. A much better product is obtained if the blanks are put through the finishing machine to shape them before being dried. Moreover in the automatic process it is found advantageous to treat them in this order.

By the employment of our improved process we avoid all manual operations between the blank forming machine and the tumbling machine, that is to say, we place the coil or roll of veneer on the blank forming machine which dies out the blanks and automatically feeds them directly to the finishing machine. From the finishing machine they pass onto a conveyer by means of which they are carried through a drying chamber and after passing through the drying chamber are dropped by the conveyer into the tumbling barrel.

The blank forming machine which we employ in practicing our process herein set forth is the same as the machine which is fully set forth and described in an application for Letters Patent therefor filed by us on the sixth day of March, 1906, Serial No. 304,503, and we do not deem it necessary in this application to set forth or describe in detail this machine, which is the preferred form of machine used by us as we at present practice our process. In like manner the finishing machine in the preferred form in which we now use it in the practice of our process is fully shown and described in an application for Letters Patent filed by us on the sixth day of November, 1905, Serial No.

285,953, and we do not deem it necessary to describe the machine in detail in this application.

When the picks leave the finishing machine they drop onto a conveyer of any well known construction. This conveyer may be actuated in the well known manner so as to cause it to move slowly and to pass through a drying chamber of a length sufficient to permit of the proper drying of the picks while they are passing through the same on the conveyer. This drying chamber is supplied with the proper currents of air in any well known way substantially as are the drying chambers which are now in use and it differs from said chambers merely in its shape and in the fact that the conveyer is arranged to pass through it. When the conveyer which is preferably of the flexible or belt type passes over the guide wheel or pulley after passing through the drier the tooth picks which are in the bucket are discharged therefrom and fall into a tumbler barrel which is placed below the buckets and in position to receive their contents. When a sufficient quantity of picks has been in this way placed in a tumbler barrel the barrel is removed and an empty one substituted in its place. As the barrels which have been filled from the conveyer are removed they are put in place on the tumbling apparatus and the tumbling operation proceeded with.

For the purpose of making the process more clear, we have shown on the accompanying sheet of drawings a diagram which is illustrative of the apparatus for practicing this process.

In said drawings, 1 indicates the coil or strip of veneer, 2 represents the die over which the strip is carried to cut the blanks. The form shown in the drawings is like that shown in our application for Letters Patent filed by us on the sixth day of March, 1906, Serial No. 304,503. The die 2 is a hollow or two-part die and the strip is forced against the die by a plunger block 3 to sever the blanks from the strip. The blanks 4 pass down through the space between the blades of the cutter-die and are received on a feed-roll 5 having grooves 6 formed in its periphery parallel with its axis. The feed-roll 5 is mounted on a rotary shaft 7 and rotates in the direction indicated by the arrow so that each groove 6 receives a blank as it passes beneath the die of the blank forming mechanism. The blanks are delivered from the grooves of the conveyer onto the curve 8 of the finishing machine 9 by which the blanks are finished into the form desired and pass out of the finishing machine at 10 onto the conveyer 11. This conveyer may be of any suitable form. As represented it is shown as an endless belt 11 running over pulleys 12, 13, and running through a drying chamber 14. They are received on one end of a conveyer as shown in the drawings and carried slowly through the drying chamber, and after they have passed out of the exit end of the drying chamber and over the pulley 13, they fall into the tumbler barrel 15 in which they are tumbled to give them a smooth final finish. The drying chamber 14 may be of any suitable construction.

16, 16, represent hot air pipes through which hot air is supplied to the drying chamber, and 17, 17, represent outlet openings so that there shall be a constant current of hot air passing through the chamber.

In order to remove the waste material when the blanks are severed from the strip, a suction pipe 18 is preferably provided adjacent to the cutting die.

What we claim is:

The process of making wooden tooth picks consisting of forming the tooth pick blanks out of green wood, trimming the blanks while in a green state into substantially the finished form, slowly drying the finished blanks in a drying chamber and then tumbling the dried picks to smooth them.

In testimony whereof we affix our signatures, in presence of two witnesses.

GEORGE P. STANLEY.
WILLIS W. TAINTER.

Witnesses:
Wm. A. Macleod,
William A. Copeland.